(12) United States Patent
Toennessen (10) Patent No.: US 7,411,863 B2
(45) Date of Patent: Aug. 12, 2008

(54) MARINE SEISMIC DATA ACQUISITION SYSTEMS AND METHODS

(75) Inventor: Rune Toennessen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 102 days.

(21) Appl. No.: 11/373,746

(22) Filed: Mar. 10, 2006

(65) Prior Publication Data

US 2007/0223306 A1 Sep. 27, 2007

(51) Int. Cl.
*G01V 1/38* (2006.01)

(52) U.S. Cl. .......................................... 367/20; 367/20
(58) Field of Classification Search .................. 367/15, 367/20; 114/244, 254
See application file for complete search history.

(56) References Cited

U.S. PATENT DOCUMENTS

| | | | |
|---|---|---|---|
| 3,063,521 A | | 11/1962 | Buckminister |
| 3,169,611 A | | 2/1965 | Snelson |
| 4,207,715 A | | 6/1980 | Kitrick |
| 5,511,039 A | * | 4/1996 | Flentge .......................... 367/56 |
| 5,598,378 A | * | 1/1997 | Flentge .......................... 367/56 |
| 5,668,775 A | | 9/1997 | Hatteland |
| 6,009,042 A | | 12/1999 | Workman et al. |

OTHER PUBLICATIONS

URL at http://www.kennethsnelson.net.
URL at http://www.westerngeco.com/q-technology.

Qin, J. (1996). A brief history of industrial mpc. Retrieved Mar. 10, 2006, from A Brief History of Industrial MPC Web site: http://www.westerngeco.com/q-technology.
Qin, J. (1996). An overview of industrial model predictive control technology. Retrieved Mar. 10, 2006, from An Overview of Industrial Model Predictive Control Technology Web site: www.che.utexas.edu/~qin/cpcv/cpcv14.html.
Qin, J. (1996). Introduction. Retrieved Mar. 10, 2006, from Introduction Web site: http://www.che.utexas.edu/~qin/cpcv/nodel.html.
Qin, J. (1996). Tables and figures. Retrieved Mar. 10, 2006, from Tables and Figures Web site: http://www.che.utexas.edu/~qin/cpcv/node32.html.

* cited by examiner

*Primary Examiner*—Mark Hellner
(74) *Attorney, Agent, or Firm*—Jeffrey L. Wendt; Liangang (Mark) Ye; Jeffrey E. Griffin (57) ABSTRACT

Systems and methods for acquiring marine seismic data are described. One system comprises a marine seismic spread adapted to survey a sub-sea geologic deposit, the spread comprising one or more seismic instruments attached to or within an instrument support bounded by a controllable boundary; and one or more control vessels coupled to the controllable boundary. One method comprises deploying a marine seismic spread as described, and surveying a sub-sea geologic feature using the marine seismic spread while controlling the controllable boundary. This abstract is provided to comply with the rules requiring an abstract, allowing a searcher or other reader to quickly ascertain the subject matter of the technical disclosure. It is submitted with the understanding that it will not be used to interpret or limit the scope or meaning of the claims. 37 CFR 1.72(b).

14 Claims, 6 Drawing Sheets

MARINE SEISMIC DATA ACQUISITION SYSTEMS AND METHODS

BACKGROUND OF THE INVENTION

1. Field of Invention

The present invention relates to the field of marine seismic data acquisition systems and methods of using same. More specifically, the invention relates to marine seismic data acquisition systems comprising a grid of seismic instruments bound by a controllable boundary, and methods for acquiring surveys using same.

2. Related Art

The performance of a marine seismic acquisition survey typically involves one or more vessels towing at least one seismic streamer through a body of water believed or known to overlie one or more hydrocarbon-bearing formations. WesternGeco currently conducts high-resolution Q-Marine™ surveys, in some instances covering many square kilometers. A survey vessel known as a Q-Technology™ vessel may conduct seismic surveys towing multiple, 1000-12000-meter cables with a separation of 25-200 meters, using the WesternGeco proprietary calibrated Q-Marine™ source. "Q" is the WesternGeco proprietary suite of advanced seismic technologies for enhanced reservoir location, description, and management. For additional information on Q-Marine™, a fully calibrated, point-receiver marine seismic acquisition and processing system, as well as Q-Land™ and Q-Seabed™, see http://www.westerngeco.com/q-technology. The seismic vessel and streamers progress forward at about 5 knots and the system is able to cover large areas of open ocean relatively efficiently. Thus, the traditional towed streamer seismic acquisition system is well-suited to explore the geological structures of previously unexplored or unexploited areas.

With the advent of 4-D marine seismic acquisition the need for improved seismic acquisition systems and techniques has been identified. 4-D seismic acquisition has time as the fourth dimension. This means that repeated seismic acquisition is made to determine how the reservoir characteristics evolve with time, mainly during production from the reservoirs and during water and gas injections, etc. 4-D seismic acquisition puts stronger requirements on resolution and re-position accuracy, leading to new possibilities in operational aspects. In contrast to 2-D and 3-D surveying of large areas of ocean, 4-D seismic acquisition is performed at already identified oil and gas fields, which mean that the areas to be covered are small compared to the areas covered when one is searching for new oil and gas fields. The areas are often crowded with obstructions like platforms and vessels. Thus, there is a need in the art for an entirely new way of positioning streamers and acoustic sources in order to efficiently cover small areas with very high positioning accuracy. Most streamer systems today are only controlled at one end by the towing vessel. The rest of the system is left to feather with the current. WesternGeco's Q-streamer™ uses small fins, so-called Q-fins™, to laterally control the streamer, but still only 3 degrees of steered feather is achieved. In addition, positioning streamer systems in areas obstructed by offshore installations may be difficult and risky. Thus, even though streamer systems cover large areas and are towed relatively fast (4-5 knots), the time lost due to feather mis-match, turning onto next line, and interference with obstructions is so large that other more controllable systems may be economically feasible.

A good 4-D acquisition system should be able, in a cost effective manner, to record weaker 4-D signals than is possible with current technology. To do so it will have to be able to filter out the noise that may be of the same order as the signal itself. If this is possible this will lead to a demand for more frequent 4-D surveys and lead to a more continuous and accurate field management. To record weak signals a minimum of resolution is required and this puts restrictions on the maximum sensor spacing. On the other hand it is not necessarily the resolution of the 4-D signal that governs the required sensor spacing. Often the noise is larger than the 4-D signal and hence the resolution of the noise is governing. The main noise factors in 4-D marine seismic acquisition comprise mis-position errors, diffracted multiples, and flow noise and mechanical noise resulting from the fluid flow. The first two noise factors are artificial signals that come from failure to repeat sensor position accurately enough for repeating the signal from the geological structure and the diffracted multiples respectively. The noise becomes apparent once making difference plots between two surveys taken at different times. The third noise type is a type of noise that must be filtered out for every data gather. Mis-position noise has received considerable attention from seismic providers. 10 meter re-position accuracy is a number often given by the geophysicist as a requirement. If the lateral sensor spacing is of the order of the required re-position accuracy, then steering is not an issue except for the purpose of maintaining good coverage. In this high density system there will always be a sensor within the re-position acceptance band. However, with today's streamer technology 37.5 m seems to be a lower limit to how close together one can tow streamers without introducing excessive operational risk. This implies that streamer steering for the purpose of re-positioning the sensors is the only feasible way using today's technology. However, as the streamers are affected by currents, it turns out to be a game of managing current, a game one cannot win efficiently. Diffracted multiples are scattered noise associated with the reflected seismic signals. This effect has received little attention mainly because it puts even stricter requirements on the resolution and re-positioning. A re-position accuracy of about 5 meters is typically demanded. Multiples also refract in all directions which means that a uniform sensor grid may be required. Lastly, flow noise is one of the dominant noise factors. The sensor spacing required depends on the resolution of the noise structure one is looking at.

The offshore seismic business has traditionally been extremely cyclic with very good profits during upturns and huge losses during downturns. In an environment like this the winner is the one that is able to ramp up quickly when prices improve and ramp down quickly when prices drop, and in addition is able to minimize capital expenditures for non-productive equipment during downturns. A seismic vessel, with its maritime crew, is expensive to run, and until now each seismic vessel needed to be designed for the purpose of handling seismic equipment. Therefore the cost associated with the vessel must be included even during downturns. For future systems one should consider this aspect and consider designing the handling equipment in such a way that it can be temporarily placed onboard readily available multi-purpose vessels like supply- and stand by vessels. As opposed to previous days of exploration that took place far away from any infrastructure, 4-D surveys take place around known oil and gas fields. In these areas there already exists infrastructure like supply- and stand-by vessels. Many of these vessels are equipped with huge diesel-electric systems mainly for the purpose of being able to supply enough power during emergency tow situations, anchor handling, and the like. These vessels often also have huge deck area that can be used for storage of containerized handling equipment and containerized instrument rooms.

To achieve high density surveys in regions having a combination of imaging and logistical challenges, a high trace density and closely spaced streamers may be used, however, this presents the potential of entangling and damaging streamer cables and associated equipment, unless streamer steering devices are closely monitored and controlled. While the Q™ suite of advanced technologies for marine seismic data acquisition and processing may provide detailed images desired for many reservoir management decisions, including the ability to acquire wide- and/or full azimuth data, the capital expense may be higher than desired in certain situations. The ability to acquire marine seismic data using less capital intensive projects, while increasing the diversity of azimuth and offset, are constant goals of the marine seismic industry and would be viewed as advances in the art. U.S. Pat. No. 6,009,042 discloses towed grids having uniformly spaced hydrophones in a "fish net" or baked into a fabric, however, their motivation was different from the present invention and as such the reference does not disclose or suggest methods and systems of the present invention.

SUMMARY OF THE INVENTION

In accordance with the present invention, systems and methods are described for acquiring marine seismic data that may provide improved resolution seismic imaging and greater re-position accuracy compared with presently employed systems and methods. The systems and methods of the invention are particularly well-suited for collecting 4-D marine seismic data, although they may also be used for 3-D seismic data collection.

The invention describes a new seismic acquisition system designed with special emphasis on the challenges associated with so-called reservoir monitoring as opposed to traditional exploration surveys where towing seismic streamers in parallel (3-D) have proven to be a cost effective method.

A first aspect of the invention comprises systems, one system comprising:
 (a) a marine seismic spread adapted to survey a sub-sea geologic deposit, the spread comprising one or more seismic instruments attached to or within an instrument support, the instrument support bounded by a controllable boundary; and
 (b) one or more control vessels, which may be ROV's, AUV's, or some other control vessels, coupled to the controllable boundary.

As used herein the term "seismic instrument" includes, but is not limited to, seismic sources, seismic sensors (sometimes referred to as seismic receivers), combinations of seismic sensors and seismic sources commonly referred to as transceivers, and other instruments useful in reservoir exploration and monitoring, including but not limited to: hydrophones, accelerometers, fluid particle velocity measuring instruments, air-guns, loudspeakers, vibrators, optical instruments; global positioning antennae; dedicated acoustic positioning sources, receivers and transceivers; equipment for measuring, recording, and/or transmitting depth, salinity, temperature, pressure, acoustic velocity, seismic receiver and source position data, and the like; and any combination thereof. Examples of seismic sensors include, but are not limited to hydrophones and the like. Examples of seismic sources include, but are not limited to air-guns, loudspeakers, vibrators, and the like. The presence of any of these seismic instruments attached to or within the instrument support does not mean there cannot be included in systems of the invention functional complementary or functionally additional instrumentation outside of the instrument support; for example, if any of the seismic instruments attached to or within the instrument support are seismic sources, one or more external seismic sources may be included in the system, for example, towed by a source vessel or some other vessel. As used herein the phrase "instrument support" means a member or members that provide a surface or volume for supporting or containing seismic instruments used in marine seismic data acquisition. Instrument supports may be 2-D or 3-D. An instrument support may be any of a net of cables, a continuous sheet, a tensegrity structure, and any combination of these. An instrument support is not an instrument housing, instrument mount, sensor housing or a sensor mount. As used herein the terms "mount" and "mounting" are meant to be broader than "house" and "housing", respectively, where a housing is a 3-D structure meant to protect an instrument, and in the case of seismic receivers, to reduce acoustic noise, whereas a mount could be 3-D housing or a 2-D area, such as a generally planar platform. An instrument mount or mounting might comprise a seismic receiver and a housing for the receiver on a platform, the platform also being large enough to also support one or more other seismic instruments that do not require a housing.

As used herein the phrases "controllable boundary" and "bounded by a controllable boundary" are not meant to be limiting in the sense that a definite physical edge or circumferential component is required around the instrument support, although in certain embodiments of the invention that will be the case. Indeed, in certain embodiments described herein, the controllable boundary may merely be a set of points or projections, such as when the instrument support is a tensegrity structure. All that is really required of the controllable boundary is that the instrument support have one or more locations, generally near its edges although the invention is not so limited, for the control vessels to grab, attach to or otherwise access the instrument support to maneuver, position, re-position, or maintain position of the instrument support. The phrase "controllable boundary" means a point, line, volume or surface, a portion or the whole of which is moveable by any of a variety of control vessels. Controllable boundaries may be 2-D or 3-D. In certain embodiments of the invention, control of one or two points of a controllable boundary may control position of an entire instrument support, and thus the position of some or all of the sensors on or in the instrument support.

Systems of the invention include those wherein I) a plurality of identical or different seismic sensors, the seismic sensors selected from a hydrophone, an accelerometer, a water particle measurement instrument or equivalent, and any combination thereof, where one instrument mount may support one of the sensors and one or more other instrument mounts support the other instruments, or where each instrument mount supports an assembly combining all types of seismic instruments used in the spread; II) a plurality of distributed seismic sources like air-guns, vibrators, loudspeakers, and the like; III) a combination of (I) and (II) where the sensor and the source may or may not be placed within/on the same instrument mount; IV) a combination of (I) and (II) wherein the hydrophone (or one of the sensors where hydrophones and accelerometers are combined) and the source is the same instrument. In this case the hydrophone could act as one of many loudspeakers in the spread; and V) any of the above mentioned combinations plus the addition of external sources in terms of a) source vessels towing air-guns or any other type of concentrated source like marine vibrators and the like, or b) other external distributed source system like explained in II.

Systems of the invention include those wherein the instrument support is selected from a net bound by cables, a grid comprised of so-called tensegrity elements, a grid of seismic instruments baked into or mounted onto a continuous sheet or fabric, and any combination thereof. There is no limitation with respect to the number, size or type of seismic instruments able to be incorporated into or onto the instrument support. However, instruments such as hydrophones, accelerometers as well as small loudspeakers like inverted hydrophones are considered most relevant.

In certain embodiments the spread may be deployed and retrieved by stand-by vessels and supply vessels available for charter or supplied by the client, therefore saving some of the expense of tailor made seismic vessels. The spread handling system may be containerized, and the size of the spread may be limited by the capacity of the containerized handling system.

Systems of the invention may employ uniformly or non-uniformly spaced instruments. Uniform spacing may be beneficial for capturing the diffracted multiples. In addition, systems of the invention allow seismic data processing that is truly 3-D and not 2-D+. Such 2-D+ data processing systems are misleadingly named 3-D, but are in fact originally based on processing techniques developed for 2-D towed streamer systems and further enhanced into "3-D" by putting multiple 2-D streamers side by side. Systems of the invention may be adapted for multi- and/or full-azimuth acquisition, which has become more and more popular over the last few years.

Other systems of the invention include those wherein the lateral seismic sensor spacing has a sufficient density so that laterally propagating pressure waves of frequencies up to 125 Hz may be captured. The spatial sampling of the wave suggested by Nyquist is then 6.25 meter, which means that lateral sensor spacing should not exceed 6.25 meter for any azimuths.

Yet other systems of the invention allow placement of seismic acoustic receivers in positions that reduce ghosting (the unwanted seismic wave field reflected off the sea surface). Designing systems of the invention that sense the direction of propagation in the vertical plane of the wave field will improve the frequency content of the signal and importantly also allow for operating the recording system deeper and away from the sea surface. Ghost elimination may also be achieved by allowing for a floating recording system wherein the sensors sit on the sea surface. In some embodiments, hydrophones may be placed with a vertical distance between them. If the required vertical distance is small this may be dealt with in the design of a sensor mounting, where two vertically spaced hydrophones are mounted in the same housing. If the required distance is larger, the systems may employ a 3-D grid, such as a tensegrity grid. In other embodiments, hydrophones and accelerometers are combined in a sensor mounting, where the hydrophones measure the pressure pulse and the accelerometer determines the direction of the wave wield. These embodiments have the advantage that they may be operated at depths further away from the sea surface than traditional systems, hence increasing the weather window often limited by swell noise. In yet other embodiments, the system is placed at the sea surface and water particle velocity is measured at the free surface using either an accelerometer or other instruments suitable for this purpose. In yet other embodiments a system of the invention may be placed on the sea floor, and ghosting may be eliminated entirely by positioning the system on the sea surface.

A net or a fabric system may comprise a good platform for instruments other than hydrophones. In some embodiments accelerometers may be added for vector sensing of the pressure wave field (de-ghosting); in other embodiments, seismic source instruments may be added that, when distributed over a large surface area, would be able to emit planar waves.

Certain embodiments of the invention may employ tensegrity structures as the instrument support, for the controlled boundary, or both. The tensegrity concept appeared as a structural art form about half a century ago and was invented by Buckminster Fuller and Kenneth Snelson (see for example www.kennethsnelson.net/). The concept comprises a combination of tension members like ropes, wires, etc, and compression members. Combining these two member types one can build up large lightweight rigid and semi-rigid structures, and by controlling the length of some or all of the tension members one is able to dramatically alter the shape of the whole structure. Currently the concept is used to design fish farms that can be designed to alter shape in accordance with wave loading.

The seismic instruments may have a uniform grid spacing of about 5 meters, however, if a 3-D grid is considered the vertical sensor distance may be considerable less than 5 meters. The grid may be built up of a net of cables where the instrument housing is located at the cable intersection point or points, or between cable intersection points, or with some at the intersection points and some between those points. Tensegrity structural embodiments may comprise a combination of tension members (cables) and stiff metal or composite compression members. A third embodiment is a system where the instrument grid is baked into or mounted onto a sheet of fabric. Some or all of the fibers in the fabric or the cable may comprise optical fibers for data transfer and communication.

The systems of the invention depend on the ability to position the controllable boundary. Once the position of the boundary is controlled, the position of the grid is controlled as well. The position of the boundary may be controlled by a number of means for positioning, for example, but not by way of limitation, remotely operated vehicles (ROV's). The minimum number of ROV's will depend on factors such as the size and power of the ROVs, size of the grid, and marine conditions, including surface conditions (in the case of systems located at or near the marine surface), marine seabed conditions (when the systems are located on the seabed), and conditions in between the seabed and sea surface when the systems are located there. The ROV's may act together in such a way to move the grid through the water and fight the currents, or guide the grid to move with the currents. Control of the boundary may be achieved by a) a high density of low-strength ROV's along the boundary, b) fewer but stronger ROV's being able to maintain a high degree of pre-tension on the boundary, c) each ROV controlling a bigger part of the boundary through multiple attachment points, d) a boundary that is rigid or semi-rigid, or e) other functional equivalents. Rigid or semi-rigid boundaries may be achieved by i) a boundary comprised of segmented rod elements having a certain stiffness, like the rod elements used in a tunnel or dome camping tent; ii) a semi-rigid boundary by pumping a high pressure fluid or gas into a container comprising the circumference of the grid; iii) a tensegrity structure around the circumference of the grid, or other functional equivalents. The container may be a "sausage"—like container.

Systems of the invention having a grid comprised only of tensegrity elements will be relatively rigid in the horizontal plane. Somewhat less rigid are inventive systems with tensegrity structure only at the boundary or the high-pressure container boundary. A high number of ROV's providing a high degree of pretension also may provide high rigidity. One benefit from a horizontally rigid system is that by determining and controlling the position of a limited number of points, one is able to determine and control the positions of all the instruments within the grid to within the degree the grid flex distances. In addition one may prevent unwanted boundary effects such as fluttering. Typical methods for determining positions of the sensors are to apply underwater acoustic ranging systems comprising acoustic sources and receivers, and couple these to known positions on the sea surface or the sea bed, for example as described in assignee's U.S. Pat. No. 5,668,775, incorporated herein by reference. A known position on the sea surface may be one or more vessel or floating bodies equipped with one or more GPS receivers and/or acoustic sources and receivers.

Certain embodiments of the inventive systems comprise a recording/handling/(shooting) vessel, which may be readily available, a containerized handling- and data recording system, multiple of ROV's that tow and control the position of the grid boundary and the grid itself. The vessel may or may not contribute with towing force. As the covered area using such a net may be smaller than the typical covered area using towed streamers, due to drag reasons and volume restrictions while stored, more than one source vessel may be required if a high number of offsets and/or azimuths is desired in the dataset. The exact size of such a grid will vary dependent on the application and physical limitations, but seen from the recording point of view a size of 200 m×1500 m or smaller may be employed, considering present towing force available for streamer towing in combination with a towing speed of 2 knots. A typical tow speed will vary between 1 and 3 knots. However for the purpose of recording as many traces as possible in one go the grid should be as large as possible.

In other inventive system embodiments, a "tailor made" seismic vessel may be employed with a tailor-made handling system and recording room. Systems of the invention may include one or more vessels such as towing vessels, chase vessels, work vessels, one or more a seismic source vessels, and a number of grid boundary control means to perform a particular survey.

Systems of the invention for acquiring marine seismic data may utilize sequential source shooting or, alternatively, two or more sources may be shot simultaneously, with the sources being encoded so that they may be distinguished during data interpretation. For the same nominal shot point interval, firing two or more sources simultaneously may reduce the shot time interval on each source line compared with sequential shooting.

A second aspect of the invention are methods of acquiring marine seismic data, one method comprising:
 (a) deploying a marine seismic spread comprising one or more seismic instruments bounded by a controllable boundary; and
 (b) surveying a sub-sea geologic feature using the marine seismic spread while controlling the controllable boundary.

Methods of the invention include those wherein the surveying includes controlling the boundary to shift the spread laterally to the next recording line. During this operation (shifting to the next line) data recording may continue. While systems and methods of the invention largely eliminate the need to perform turns as in towed seismic streamer data acquisition in order to position the spread for the next line, systems of the invention could be used in this way as well. Controlling the boundary properly should, however, eliminate the need for turning. Methods of the invention include positioning the controllable boundary to acquire wide- and/or full azimuth seismic surveys.

Other methods of the invention comprise controlling the controllable boundary with one or more PI or PID controllers alone or in conjunction with other controllers. For example, systems and methods of the invention may benefit from one or more controllers that control position of one or more tracking points. Tracking points may be anywhere in the marine seismic spread, for example but not limited to the center of a source, a center of a grid, a tracking point somewhere other than the center of the grid, and the like. Tracking points may be dynamically or non-dynamically moved within a spread to optimize a given steering strategy, particularly during data acquisition during turns and other curvilinear paths. Controllers may be physically a part of a vessel steering sub-system or located separately from the steering sub-system, and may use some or all available information, including, but not limited to, source and vessel positions, grid element positions, grid boundary position, vessel gyroscope readings, vessel compass readings, vessel speed logs, streamer front end positions (if streamers are present), and historical, real-time, and future current and wind information and predictions. Controllers may be selected from PI controllers, PID controllers (including any known or reasonably foreseeable variations of these. Other possible implementations of the invention are those wherein one or more controllers comprise more specialized control strategies, such as strategies selected from feed forward, cascade control, internal feedback loops, model predictive control, neural networks, and Kalman filtering techniques.

Systems and methods of the invention may optionally be used in conjunction with other systems and methods. For example, combination systems may be employed, wherein the seismic spread includes both towed streamers and one or more controllable boundary grids. If the center of the grid is a tracking point, its 3-D coordinate position may be determined from acoustic ranging networks, GPS, and other position sensors, and since the seismic team knows the path each tracking point is supposed to follow based on the survey specifications, the controllers may use at least that information to calculate residuals, and a series of set points based on the residuals, for the steering algorithms of each vessel, either to steer the vessels back to the survey-specified paths, or ensure that the survey-specified paths are adhered to.

Systems and methods of the invention will become more apparent upon review of the brief description of the drawings, the detailed description, and the claims that follow.

BRIEF DESCRIPTION OF THE DRAWINGS

The manner in which the objectives of the invention and other desirable characteristics can be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, in the discussion herein, aspects of the invention are developed within the general context of acquiring marine seismic data in more cost efficient manner, which may employ vessels ranging in cost and complexity. A typical marine seismic vessel adapted to shoot, record, and process seismic signals may include many specialized features and equipment that perform particular tasks or implement particular surveys. However, as will become apparent, the invention is not limited to use of these "tailor-made" seismic vessels. Moreover, those skilled in the art will appreciate that the invention may be practiced in whole or in part with other vessel configurations, including vessel performing but one function, such as position control of a grid of seismic instruments, vessel including containerized equipment handling systems, and the like. In a distributed vessel spread design, vessels may be located in many locations in and around the spread. It is noted, however, that modification to the systems and methods described herein may well be made without deviating from the scope of the present invention. Moreover, those skilled in the art will appreciate, from the discussion to follow, that the principles of the invention may well be applied to other aspects of seismic data acquisition. Thus, the systems and method described below are but illustrative implementations of a broader inventive concept.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention relates to various systems and methods for acquiring marine seismic data, particularly to systems and methods for acquiring such data in a cost-effective manner, wherein "cost-effective" may be defined as employing marine vessels that are less capital expensive than vessels such as those known under the trade designation "Q", used by the assignee of the present invention primary for marine seismic exploration. The systems and methods of the invention may be particularly adept at acquiring true 3-D marine seismic data, 4-D marine seismic data for known sub-sea features, such as hydrocarbon reservoirs and the like, in narrow or wide- and/or full azimuth marine seismic data with a variety of offset. Current technology for marine seismic acquisition is based on one (2-D) or several parallel (3-D) streamer cables being towed by a specially-designed seismic ship. The streamers may be up to 12 km long. Acoustic sources (air guns) are placed in front of the streamers, towed by the same ship. A lot of effort has been put into optimizing the towing resistance, stability and positioning accuracy of the streamers. WesternGeco has developed the state-of-the-art Q-type streamers, with unsurpassed positioning accuracy and sensor technology. The spread progresses forward at about 5 knots, and is able to cover large areas of open ocean relatively efficiently. Thus, the traditional seismic acquisition system is well-suited to explore the geological structures of previously unexplored or unexploited areas, but may not be well-suited for certain other tasks, such as 4-D evaluation.

The term "spread" and the phrase "seismic spread" are used interchangeably herein and mean the total number of components, including vessels, vehicles, cables, sources and receivers, that are used together to conduct a marine seismic data acquisition survey.

As used herein the phrase "wide- and/or full azimuth seismic survey" means acquiring marine seismic data through a range of (or all) angles that a direct line from a seismic source to a seismic receiver makes with true north.

The term "position", when used as a noun, is broader than "depth" or lateral (horizontal) movement alone, and is intended to be synonymous with "spatial relation." Thus "vertical position" includes depth, but also distance from the seabed or distance above or below a submerged or semi-submerged object, or an object having portions submerged. When used as a verb, "position" means cause to be in a desired place, state, or spatial relation. The term may also include orientation, such as rotational orientation, pitch, yaw, and the like.

Figure 1:
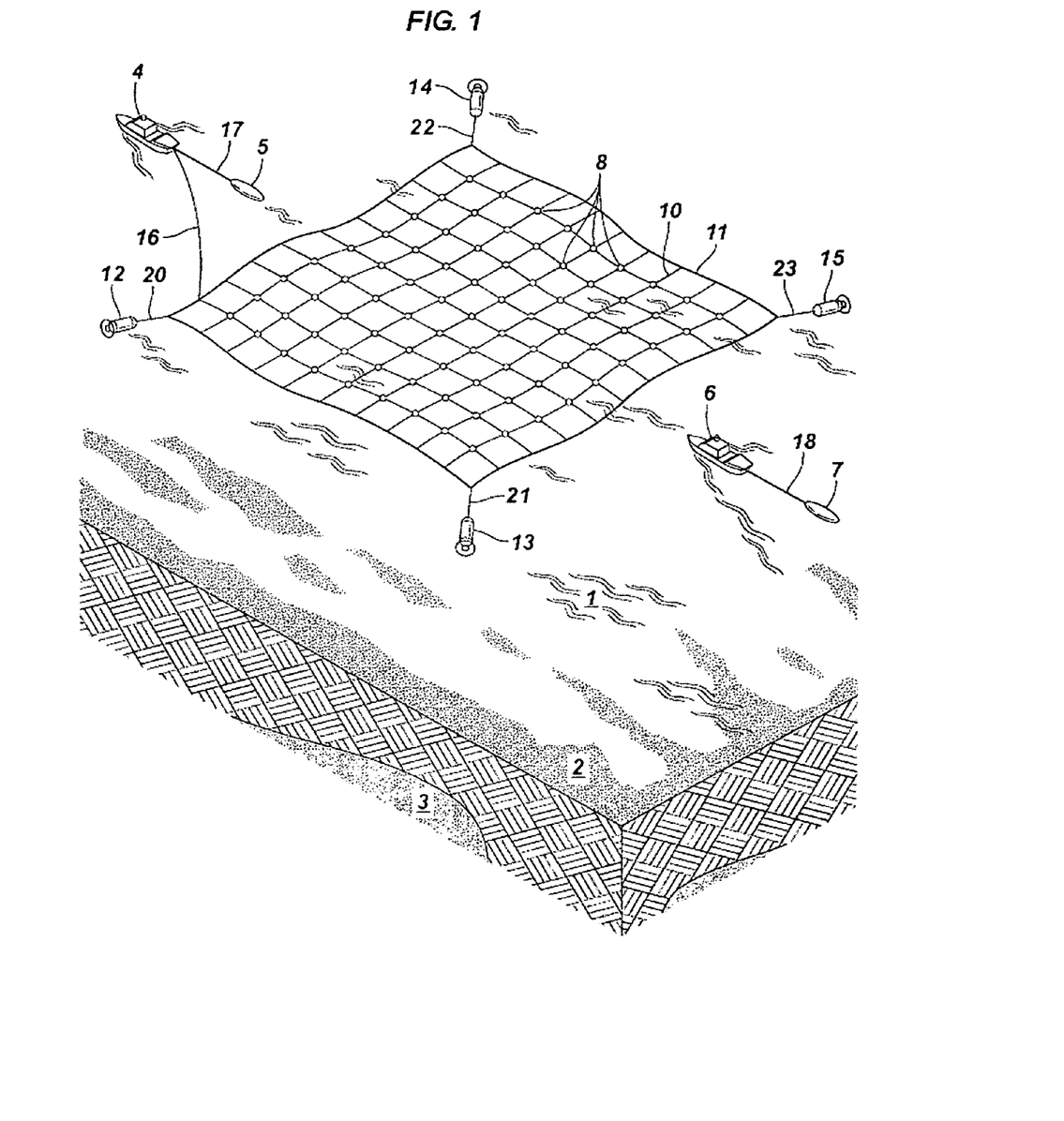
FIG. 1 is a schematic perspective view of one embodiment of the invention.

FIG. 1 is a schematic perspective view of one embodiment of the invention. Illustrated at 1 is a body of water covering a sea-bed 2, which in turn includes a deposit or reservoir of interest, such as a hydrocarbon deposit 3. A first vessel 4 tows a seismic source 5 via a tow cable 17, and an optional second vessel 6 tows a second seismic source 7 via a tow cable 18. Second source 7 may provide greater azimuth range and offset data. A grid of seismic instruments 8 are supported by an underwater instrument support 10 having a controllable boundary 11, controlled by control vessels 12, 13, 14, and 15, which may be ROVs, AUVs or any other device able to move or maintain the position of controllable boundary 11. Seismic instruments 8 need not be at the points of intersection. Control vessels 12, 13, 14, and 15 are tethered to controllable boundary 11 by cables 20, 21, 22, and 23, respectively. Cables 20, 21, 22, and 23 may be static cables or active cables in terms of motion, and may include communication and/or power lines, such as fiber optics, hard wires, and the like. Wireless communication equipment is also possible. As may be seen in FIG. 1, control of controllable boundary 11 controls position of instrument support 10 and seismic instruments 8. Seismic instruments 8 may be on or within sensor mountings, such as when surveying is accomplished by measuring pressure pulses using two hydrophones placed with a vertical distance between them, achieved by a sensor housing design. Another alternative, surveying may include measuring pressure pulses using hydrophones and determining the direction of seismic wave field using accelerometers, the hydrophones and accelerometers combined in a sensor mounting. Yet other alternatives include only accelerometers, air-guns, underwater loudspeakers, water particle velocity measuring devices, and any combination thereof mounted in or on an instrument mounting which is on or in an instrument support. Some instrument mountings in the grid may comprise one combination of seismic instruments and other instrument mountings may comprise other combinations of seismic instruments. Yet other mountings may comprise other instruments.

Figure 2:
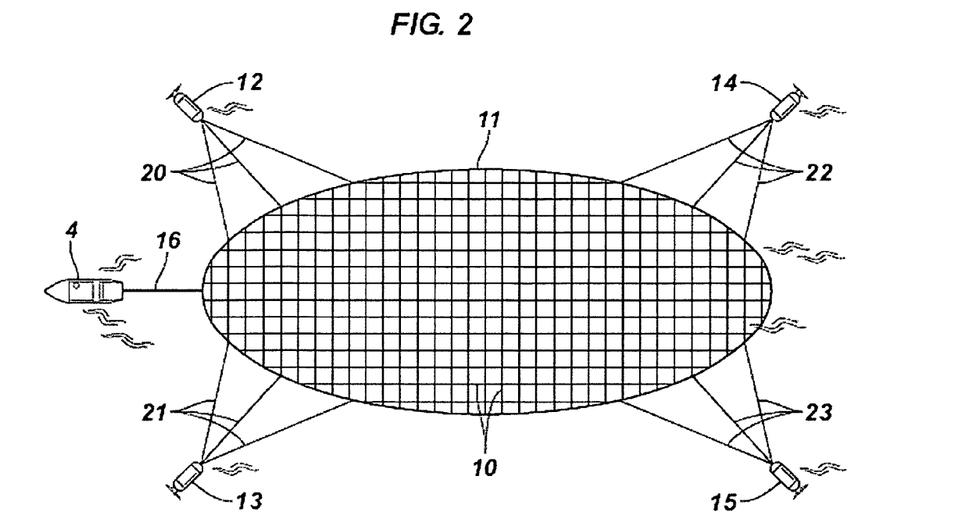
FIGS. 2 and 3 are schematic plan views of two embodiments of the invention.
Figure 3:
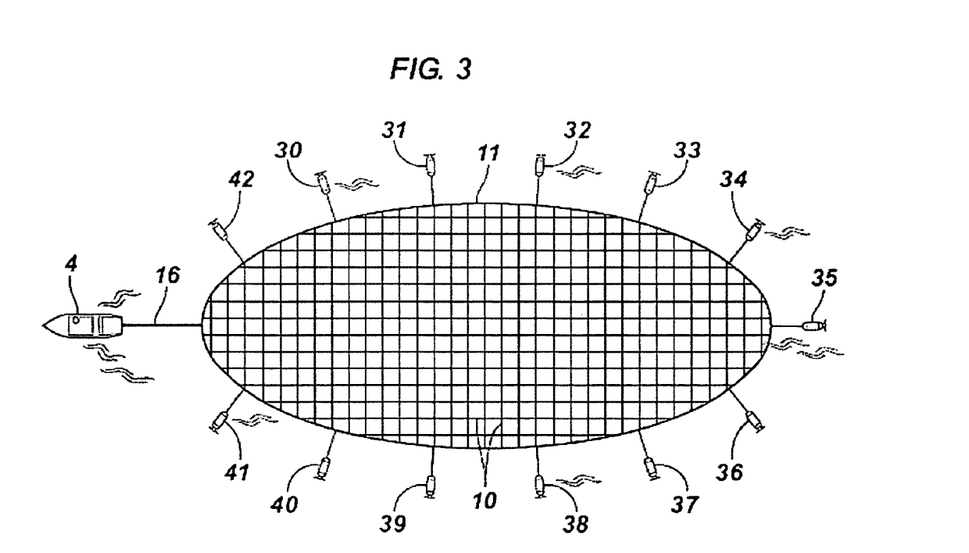

FIGS. 2 and 3 are schematic plan views of two embodiments of the invention. Note that the same numerals are used throughout the figures to designate same components unless otherwise mentioned. In the embodiments illustrated in both FIGS. 2 and 3, an instrument support 10 is shown, as is a controllable boundary 11. Seismic instruments are not shown in these two figures, nor are seismic sources. In both embodiments, controllable boundary 11 is drawn outward away from a center of the instrument support by control vessels. In the embodiment illustrated in FIG. 2, four control vessels 12, 13, 14, and 15 each are tethered to controllable boundary 11 by three cables, while the embodiment illustrated in FIG. 3 includes thirteen control vessels 30-42, inclusive, each tethered by a single cable to controllable boundary 11. For a given similar size of grid formed by the instrument support and controllable boundary, the embodiment of FIG. 2 includes fewer, but more powerful control vessels 12, 13, 14, and 15, compared with the control vessels required in the embodiment of FIG. 3, which includes more control vessels, but each being less powerful. It should be mentioned that any combination of control vessels of different power could be employed. For example, in certain embodiments where a source vessel also serves to pull a spread, the control vessels nearer a source vessel might have a lower power range than those positioned further away from the source vessel. In seas where a predominant cross-current is known or anticipated, the control vessels may be more powerful on the side which encounters the current first. Many variations are possible, and are considered within the present invention.

As noted by the inventors of U.S. Pat. No. 4,207,715, in his U.S. Pat. No. 3,063,521, Richard Buckminster Fuller introduced the tensile integrity, or tensegrity, construction technique. Tensegrity construction is based on the realization that most building materials are much more efficiently utilized, smaller cross sectional areas can be employed, and the materials can often withstand higher forces, when in tension than when in compression. In tensegrity construction there is a high ratio of tension to compression elements. The tension elements provide continuous lines of tension throughout a structure; whereas there is separation of the compression forces such that the compression members are discontinuous. The compression members in effect float within a sea of tension. These and like structures may be used to advantage in the systems and methods of the invention.

Figure 4A:
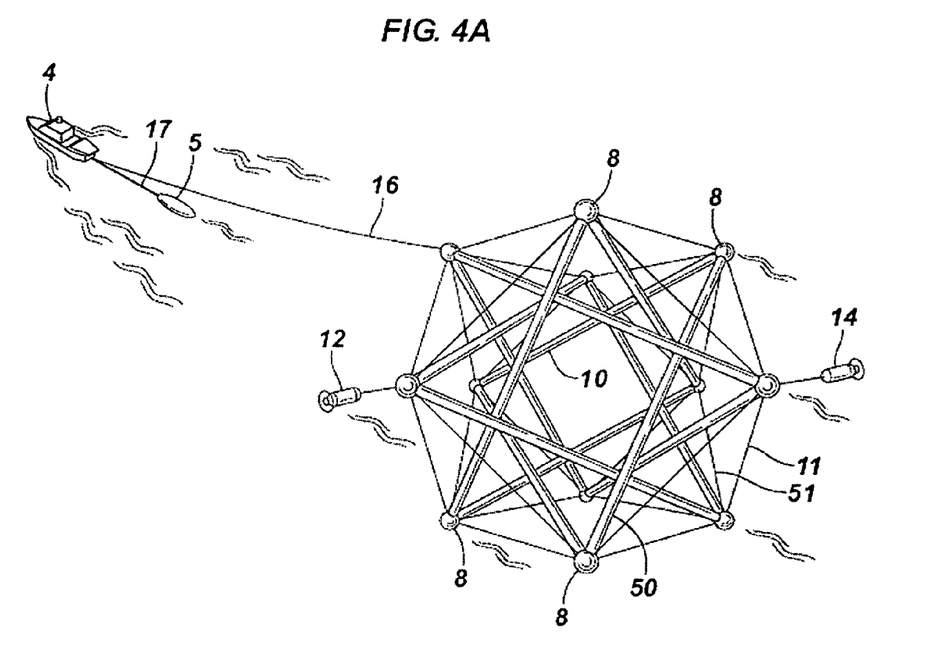
FIGS. 4A and 4B are schematic perspective views of two embodiments of the invention.
Figure 4B:
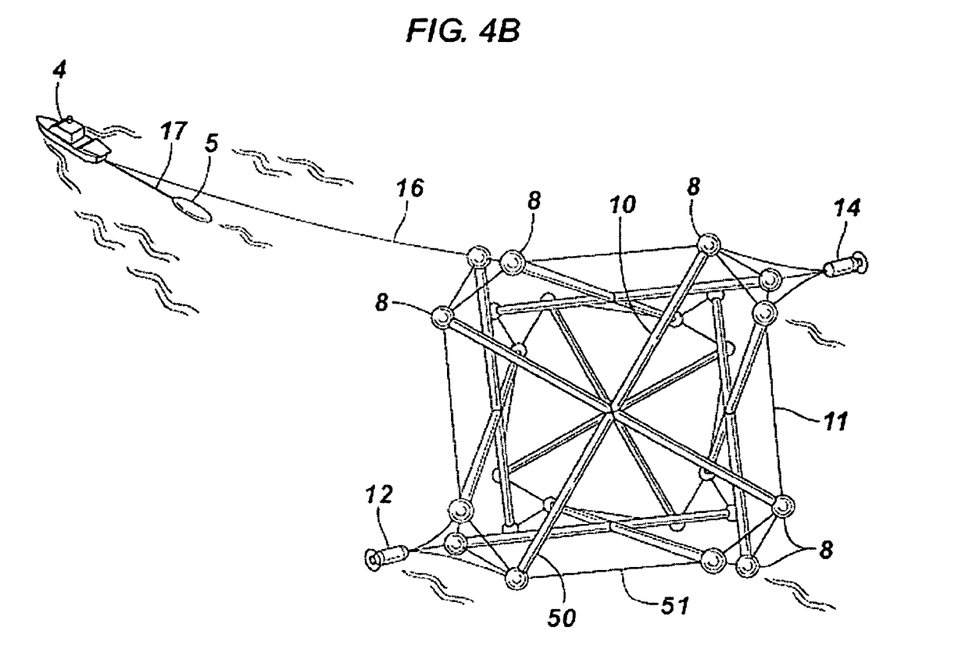

FIGS. 4A and 4B are schematic perspective views of two embodiments of the invention employing tensegrity elements. There are many variations of tensegrities, as shown in various publications, and the invention is not limited to any particular version. The embodiments of FIGS. 4A and 4B each include an instrument support 10 and control boundary 11, which includes both lines and points. At the points in this embodiment are seismic instruments 8, which may be in sensor mountings, but the seismic instruments need not be at the points of intersection. Control vessels 12 and 14 are each tethered to a single controllable boundary point, while in the embodiment illustrated in FIG. 4B, control vessels 12 and 14 are each tethered to the controllable boundary at three points. The tensegrities illustrated each have a plurality of compression elements 50 and a plurality of tension elements 51. If desired, two or more tensegrity elements may be combined to form extended structures. Multiple sources and source vessels may also be used to increase azimuth and offset. The tensegrity structure may be constructed in 2D or in 3D. As will be apparent to those in skill in the marine seismic art, the seismic instruments may be located within the tensegrity structure and not only along the boundary, as may be the impression given in FIGS. 4A and 4B. Furthermore, the tensegrity structure may be much denser (in terms of the number of elements and seismic instruments) and much coarser than illustrated.

Figure 5:
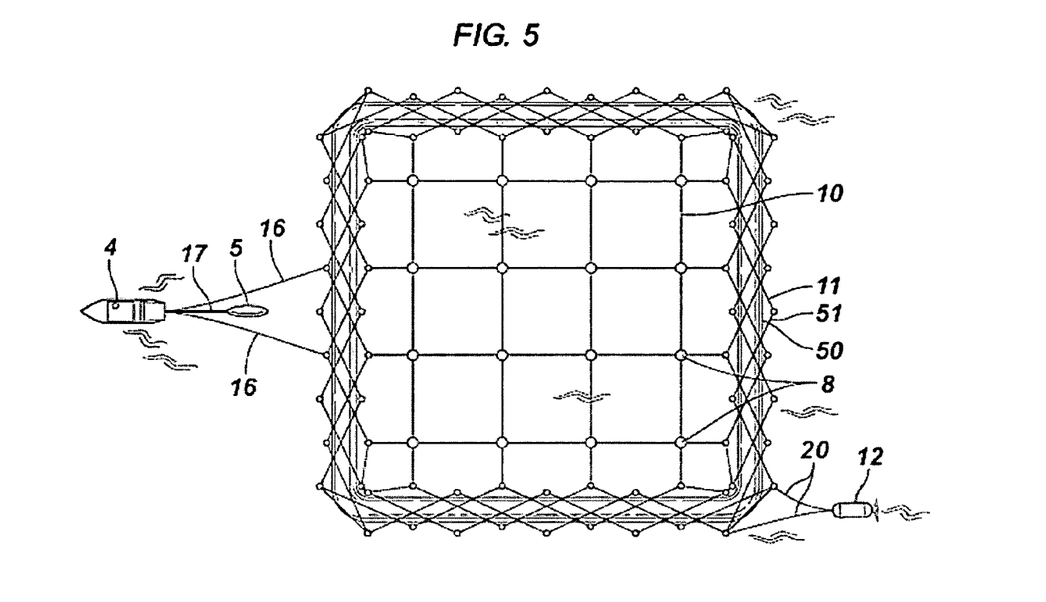
FIGS. 5 and 6 are schematic plan views of two embodiments of the invention.
Figure 6:
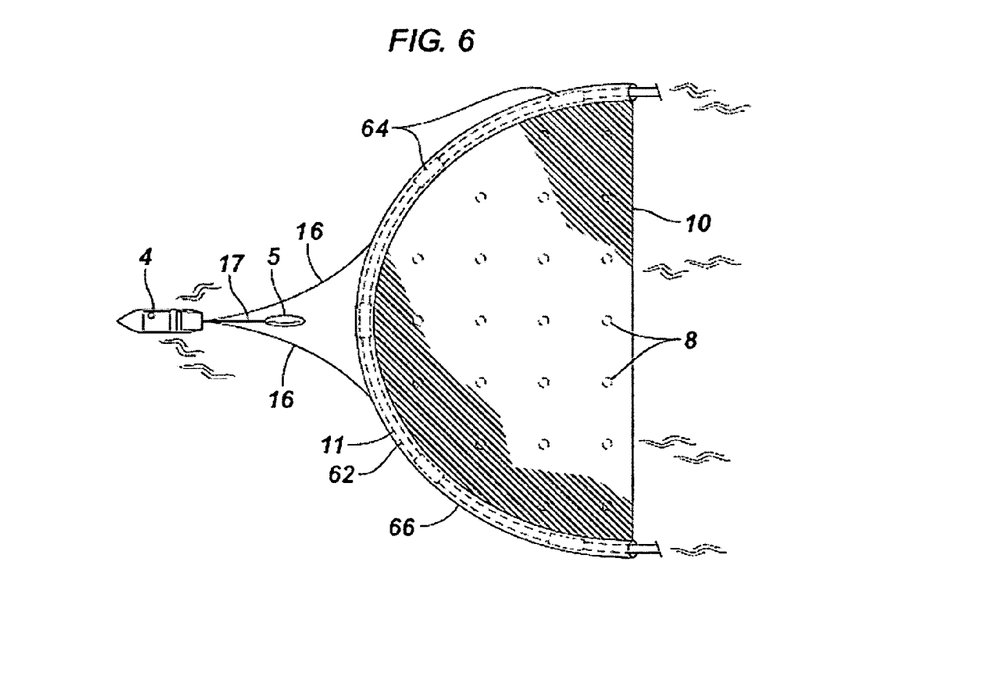

FIGS. 5 and 6 are schematic plan views of two other embodiments of the invention. The embodiment of FIG. 5 includes tensegrity structures as controllable boundary 11, including compression members 50 and tension members 51. A plurality of seismic instruments 8 and other instruments are support on an instrument support 10, which may be a net of cables, the instruments typically mounted in or on sensor mountings at or near the intersections of the cables, or somewhere between intersections, to achieve a desired distribution of seismic sensors that may or may not be uniform. While only one control vessel 12 is depicted, having dual tether cables 20, more than one control vessel may be employed. This embodiment may float on the surface, may be submerged under the marine surface, or located on the seabed, as other embodiments. The embodiment of FIG. 6 comprises a fabric sheet 10 as instrument support, with seismic instruments 8 distributed inside the fabric. Seismic instruments 8 could just as well be fastened to the outside surfaces of fabric 10. In this embodiment the controllable boundary 11 is formed by interlocking, semi-rigid members 62, shown in phantom. As an example, interlocking members 62 each may have one male end (not shown) and one female end 64, the male ends fitting inside the female ends, much like flexible camping tent poles. Members 62 and ends 64 fit through a passage 66 in the edge of fabric instrument support 10, again like a camping tent construction. No control vessels are depicted for clarity purposes, but one or more control vessels may be employed along with source vessel 4. Note that the interior regions of the embodiments of FIG. 5 may comprise a continuous sheet or a tensegrity structure. The interior of the embodiment of FIG. 6 may comprise a net of cables or a tensegrity structure, and controllable boundary 11 of FIG. 6 may close around the whole of the fabric sheet or net 10.

Figure 7:
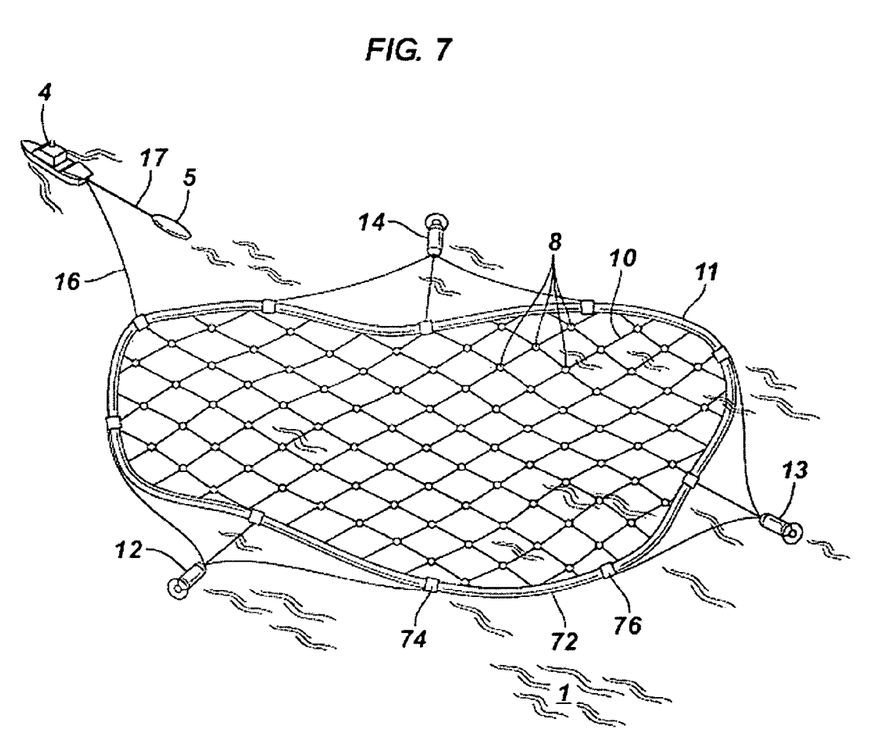
FIG. 7 is a schematic perspective view of another embodiment of the invention.

FIG. 7 is a schematic perspective view of another embodiment of the invention. In this embodiment, the controllable boundary 11 comprises fluid pressurized sections 72 fastened together with connectors 74. The fluid may be gas, such as air or nitrogen, or liquid having specific gravity for the intended submerged depth. Alternatively, the fluid may have a specific gravity less than the prevailing sea water, providing a surface floating controllable boundary. Three control vessels 12, 13, and 14 are illustrated, each tethered to controllable boundary 11 by three cables, but the embodiment is not so limited. The instrument support 10 is shown similar to that depicted in FIG. 5, but alternatively could comprise any of the various supports mentioned herein and functional equivalents.

Any one of many possible control schemes may be useful in the systems and methods of the invention to control actions of the control vessel or vessels, to control position of the controllable boundary, and ultimately control position of seismic instruments 8. The term "control", used as a transitive verb, means to verify or regulate by comparing with a standard or desired value. Control may be closed loop, feedback, feed-forward, cascade, model predictive, adaptive, heuristic and combinations thereof.

The term "controller" means a device at least capable of accepting input from sensors and meters in real time or near-real time, and sending commands directly to one or more control vessel steering sub-systems or other local or remote devices able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features, as further explained herein. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered useful in practicing the methods and systems of the invention.

The phrase "control element" means a component of one or more control vessels that is controllable and is capable of causing a control vessel to change coordinates, either vertically, horizontally, or both, and may or may not be remotely controlled.

The terms "control position", "position controllable", "remotely controlling position" and "steering" are generally used interchangeably herein, although it will be recognized by those of skill in the art that "steering" usually refers to following a defined path, while "control position", "position controllable", and "remotely controlling position" could mean steering, but also could mean merely maintaining position. In the context of the following discussion, "control position" means we use a measured position of a component and compare it to a desired position in order to give commands to control vessel elements.

"Real-time" means dataflow that occurs without any delay added beyond the minimum required for generation of the dataflow components. It implies that there is no major gap between the storage of information in the dataflow and the retrieval of that information. There may be a further requirement that the dataflow components are generated sufficiently rapidly to allow control decisions using them to be made sufficiently early to be effective. "Near-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after the next process in the decision line receives them.

One or more simple PID feedback loops may be used to control the control vessels. The main components include the control vessel, a tracking point, which may be an imaginary point anywhere in the spread, such as the center of a grid, or a point of attachment of a control vessel tether cable to a controllable boundary. A PID controller compares a set point position of a tracking point with a measured 3-D coordinate position of the point, and calculates a difference, referred to herein as a residual or residual difference, and generates a command as a set point to a control element of one or more control vessels, which may be rudders or thrusters.

Model Predictive (MP) controllers rather than PID controllers may be used. The characteristics of each are discussed herein below. MP controllers may be mono-variable or multivariable MP controllers. An MP controller compares a set point position of an item with a measured 3D coordinate position, and uses a pre-existing mathematical model of the system in conjunction with measured disturbances on the system, such as wind, currents, and the like, and calculates a residual and generates a command as a set point track to a control vessel rudder and/or control vessel thruster. A modification of the set point signal may be made by a feed-forward controller, which may optionally feed historical, real time or near-real time, or future predictions of data regarding current and/or wind as a modification to the set point. Optionally, historical information regarding wind, current, and other environmental conditions, or information regarding obstructions in the designated survey area, and the like, may be fed forward. Position of the controllable boundary and instrument support may then be obtained in a more controlled and stable fashion using an MP controller and feed-forward controller, rather than an MP controller alone, or a human operator.

Controllers useful in the systems and methods of the invention may vary in their details. One PID controller useful in the invention may be expressed mathematically as in Equation 1:

$$u(t)=K_p[e(t)+1/T_i \cdot \int e(t)dt+T_d \cdot \dot{e}(t)] \tag{1}$$

wherein:
$\int$ means integrate;
$\dot{e}(t)$ means the time derivative;
u(t) is controller output, typically in meters or sub-meters of position change;
e(t) means difference between wanted (planned, reference) and measured (current position, y) value of a point of interest;
$T_d$ is a constant for describing the derivative part of the algorithm (the derivative part may be filtered to avoid deriving high frequencies);
$T_i$ is a constant for describing the integrating part of the algorithm; and
$K_p$ is a proportional gain constant.

In the s-plane (Laplace), the PID controller may be expressed as (Equation 2):

$$H_r(s)=K_p[1+1/T_i s+T_d s/(1+T_f s)] \tag{2}$$

wherein:
s is the variable in the s-plane; and
$T_f$ is a constant describing the filtering part of the derivative part of the algorithm.

For discretization, a variety of transforms may be employed, and some constants may or may not be useful. For example, the $T_f$ constant may not be necessary in some instances, but may be especially useful in other scenarios. As one discretization example, the z-transform may be used, meaning that the integral part of the algorithm may be approximated by using a trapezoid model of the form (Equation 3):

$$s=(1-z_{-1})/T \tag{3}$$

while the derivative part may be approximated using an Euler model (Equation 4):

$$s=2/T \cdot (1-z_{-1})/(1+z_{-1}) \tag{4}$$

wherein T is the sampling time.

The resulting discrete model may then be used directly in the control algorithm. Other discrete models, derived using other transforms, are useful in the invention, and will be apparent to control technicians or control engineers of ordinary skill.

Model Predictive Control (MPC) is an advanced multivariable control method for use in multiple input/multiple output (MIMO) systems. An overview of industrial Model Predictive Control can be found at: www.che.utexas.edu/~qin/cpcv/cpcv14.html. MPC computes a sequence of manipulated variable adjustments in order to optimize the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . . MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like. It may be difficult to explicitly state stability of an MPC control scheme, and in certain embodiments of the present invention it may be necessary to use nonlinear MPC. In so-called advance spread control of marine seismic spreads, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

Feed forward algorithms, if used, will in the most general sense be task specific, meaning that they will be specially designed to the task they are designed to solve. This specific design might be difficult to design, but a lot is gained by using a more general algorithm, such as a first or second order filter with a given gain and time constants.

In use, systems and methods of the invention such as discussed herein and their functional and structural equivalents are particularly adept for 3-D and so-called 4-D marine seismic data acquisition surveys. More specifically, the various control systems and methods may be integrated into an overall seismic vessel steering strategy, and may be integrated into positioning strategies for the other spread elements.

Systems of the invention may communicate with the outside world, for example another vessel or vehicle, a satellite, a hand-held device, a land-based device, and the like. The way this may be accomplished varies in accordance with the amount of energy the system requires and the amount of energy the system is able to store locally in terms of batteries, fuel cells, and the like. Batteries, fuel cells, generators and the like may be employed, and wireless communication may be sufficient. Alternatively, or in addition, there may be a hardwire power connection and a hard wire communications connection to another device, this other device able to communicate via wireless transmission.

Certain systems and methods of the invention may work in feed-forwarded fashion with existing control apparatus and methods to position not only the control vessels, but seismic sources and receivers. Source and receiver positions may be actively controlled by using GPS data or other position detector sensing the position of the instrument support (e.g. underwater acoustic network), or other means may sense the orientation of one or more individual cables of the instrument support (e.g. compass) and feed this data to navigation and control systems. Gross and fine positioning and local movement of one or more tracking points, position of controllable boundaries (points, lines, surfaces) may be controlled via controlling one or more control vessels locally, or from a remote location. By using a communication system, either hardwire or wireless, environmental information may be sent to one or more local control vessel controllers, as well as the controller for one or more source vessels. The local controllers may in turn be operatively connected to control elements of the control vessels. This in turn adjusts the position of the controllable boundary and instrument support, causing them to move as desired. Feedback control may be achieved using local sensors positioned as appropriate depending on the specific embodiment used, which may inform the local and remote controllers of the position of one or more control vessels, position of sections of or the whole of the controllable boundary, distance between sections of the controllable boundary, a position of an actuator, the status of a motor or hydraulic cylinder, the status of a thruster or rudder, and the like. A computer or human operator can thus access information and control the entire positioning effort, and thus obtain much better control over the seismic data acquisition process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A marine seismic spread system comprising:
(a) one or more seismic instruments attached to or within a plurality of compression elements and a plurality of tension elements of a tensegrity structure, the tension elements connecting ends of the compression elements and extending throughout the structure in a continuous network, the ends of the compression elements functioning as controllable projection points; and
(b) one or more control vessels coupled to one or more of the controllable projection points, each control vessel able to control position of the tensegrity structure and thus change position of all the seismic instruments by exerting force on one or more controllable projection points.

2. The system of claim 1 selected from I) a plurality of identical or different seismic sensors, the seismic sensors selected from a hydrophone, an accelerometer, a water particle measurement instrument or equivalent, and any combination thereof, where one instrument mount supports one of the sensors and one or more other instrument mounts support the other instruments, or where each instrument mount supports an assembly combining all types of seismic instruments used in the spread; II) the one or more seismic instruments comprises a plurality of distributed seismic sources; III) a combination of (I) and (II) wherein the seismic sensors and the seismic sources may or may not be placed within/on the same sensor mount; IV) a combination of (I) and (II) wherein the seismic sensors and the seismic sources are combined in the same instrument; and V) any of (I)-(IV) plus one or more seismic sources positioned external of the tensegrity structure.

3. The system of claim 1 wherein at least one of the control vessels is an ROV or AUV.

4. The system of claim 1 wherein a portion of the seismic instruments are selected from accelerometers, hydrophones, loudspeakers, vibrators, inertial sensors, depth sensors, salinity sensors, temperature sensors, pressure sensors and satellite signal receivers.

5. The system of claim 1 wherein the spread is deployed and received by one or more vessels selected from seismic vessels, vessels other than seismic vessels, and combinations thereof.

6. The system of claim 5 wherein the vessel comprises a containerized handling system, and the size of the spread is limited by the containerized handling system.

7. The system of claim 1 wherein the one or more control vessels exert force on the controllable projection points sufficient to allow multi- and/or full-azimuth seismic data acquisition.

8. The system of claim 1 wherein lateral seismic sensor spacing has a sufficient density so that laterally propagating pressure waves of frequencies up to 125 Hz may be captured.

9. The system of claim 8 wherein the lateral sensor spacing does not exceed 6.25 meters for any azimuths.

10. The system of claim 1 wherein at least some of the seismic instruments are selected from:
   a) hydrophones placed with a vertical distance between them, achieved either by
      i) a sensor housing design, or
      ii) designing the instrument support to be 3-D;
   b) hydrophones and accelerometers combined in or on a sensor mounting, where the hydrophones measure pressure pulses and the accelerometer determines direction of wave field; and
   c) means for measuring water particle velocity.

11. A system comprising:
   a) one or more vessels functioning as a recording and/or handling vessel;
   b) a containerized handling- and data recording system;
   c) one or more seismic instruments attached to or within a plurality of compression elements and a plurality of tension elements of a tensegrity structure, the tension elements connecting ends of the compression elements and extending throughout the structure in a continuous network, the ends of the compression elements functioning as controllable projection points, and a plurality of control vessels each tethered to a controllable projection point, each control vessel able to change shape of the entire tensegrity structure and thus change position of all the seismic instruments by exerting force on one or more controllable projection points.

12. A method comprising:
   a) towing a marine seismic spread comprising one or more seismic instruments attached to or within a plurality of compression elements and a plurality of tension elements of a tensegrity structure, the tension elements connecting ends of the compression elements and extending throughout the structure in a continuous network, the ends of the compression elements functioning as controllable projection points, and a plurality of control vessels each tethered to a controllable projection point; and
   b) surveying a sub-sea geologic feature using the marine seismic spread while controlling shape of the entire tensegrity structure using the control vessels and thus controlling position of all the seismic instruments by exerting forces on one or more of the controllable projection points.

13. The method of claim 12 wherein at least some of the seismic instruments are placed in positions selected from positions that reduce ghosting of seismic data, and positions so that they are able to sense direction of seismic signal propagation in a vertical plane of a seismic wave field.

14. The method of claim 12 wherein the surveying is accomplished by
   a) measuring pressure pulses using hydrophones placed with a vertical distance between them, achieved either by:
      i) a sensor housing design, or
      ii) designing the instrument support to be 3-D;
   b) measuring pressure pulses using hydrophones and determining the direction of wave field using accelerometers, the hydrophones and accelerometers combined in a sensor mounting; and
   c) measuring water particle velocity.

* * * * *